(12) United States Patent
Morehead et al.

(10) Patent No.: US 10,918,098 B2
(45) Date of Patent: Feb. 16, 2021

(54) TACKLE BUDDY

(71) Applicants: Jesse Morehead, Danville, AL (US);
John Wydner, Danville, AL (US)

(72) Inventors: Jesse Morehead, Danville, AL (US);
John Wydner, Danville, AL (US)

(73) Assignee: John Wydner, Danville, AL (US)

( * ) Notice: Subject to any disclaimer, the term of this patent is extended or adjusted under 35 U.S.C. 154(b) by 532 days.

(21) Appl. No.: 15/656,837

(22) Filed: Jul. 21, 2017

(65) Prior Publication Data

US 2018/0020652 A1 Jan. 25, 2018

Related U.S. Application Data

(60) Provisional application No. 62/365,078, filed on Jul. 21, 2016.

(51) Int. Cl.
*A01K 97/06* (2006.01)
*A01K 97/10* (2006.01)
*A01K 97/22* (2006.01)
*A01K 97/04* (2006.01)
*B63B 29/06* (2006.01)
*A47C 7/62* (2006.01)
*B63B 29/04* (2006.01)

(52) U.S. Cl.
CPC .............. *A01K 97/10* (2013.01); *A01K 97/04* (2013.01); *A01K 97/06* (2013.01); *A01K 97/22* (2013.01); *A47C 7/622* (2018.08); *A47C 7/626* (2018.08); *B63B 29/06* (2013.01); *B63B 2029/043* (2013.01)

(58) Field of Classification Search
CPC ........ A01K 97/04; A01K 97/22; A01K 97/10; A01K 97/06; A47C 7/62; A47C 7/622; A47C 7/626
USPC ............... 43/54.1, 21.2; 297/188.01, 188.08, 297/188.2; 206/372–374, 315.11; 224/920, 922
See application file for complete search history.

(56) References Cited

U.S. PATENT DOCUMENTS 1,469,938 A * 10/1923 Kennedy ................... B60R 9/02
206/373
2,607,398 A * 8/1952 Andrews ................ A01K 97/10
248/513

(Continued)

FOREIGN PATENT DOCUMENTS

| CA | 2393288 A1 * | 1/2004 | ............. A01K 97/22 |
|---|---|---|---|
| FR | 2059912 A5 * | 6/1971 | ............. A01K 97/22 |
| FR | 2704725 A1 * | 11/1994 | ............. A01K 97/22 |

*Primary Examiner* — Darren W Ark (57) ABSTRACT

A fishing accessory organizer that is installed underneath of a boat seat to allow a user to conveniently locate and retrieve equipment. The fishing accessory organizer includes a container body through which a seat pole hole traverses. The container body is fitted around a pedestal pole of a boat seat, wherein the pedestal pole traverses through the seat pole hole, such that the container body may freely rotate about the pedestal pole. A plurality of organization cavities is formed into the container body, wherein each of the plurality of organization cavities is of various shape and size to accommodate different fishing equipment. A locking plate positioned below the container body allows the user to adjust the height of the container body and configure the optimal reach.

11 Claims, 6 Drawing Sheets

(56) References Cited

U.S. PATENT DOCUMENTS

| | | | | |
|---|---|---|---|---|
| 2,692,007 A * | 10/1954 | Christian | A01K 97/10 | 297/188.08 |
| 2,718,251 A * | 9/1955 | Luca Barbato | A63B 55/406 | 150/159 |
| 2,919,169 A * | 12/1959 | Jackson | A47J 47/02 | 312/235.2 |
| 3,077,327 A * | 2/1963 | Batie | A01K 97/06 | 248/520 |
| 3,947,991 A * | 4/1976 | Morcom | A01K 97/06 | 43/54.1 |
| 4,085,686 A * | 4/1978 | Turner | A01K 97/06 | 108/25 |
| 4,184,281 A * | 1/1980 | Corby | A01K 97/05 | 114/363 |
| 4,428,617 A * | 1/1984 | Lawson | A01K 97/06 | 114/363 |
| 4,460,085 A * | 7/1984 | Jantzen | B25H 3/003 | 206/349 |
| 4,500,059 A * | 2/1985 | Papizan | A01K 97/06 | 206/315.11 |
| 4,505,386 A * | 3/1985 | Abrahamson | B25H 3/02 | 206/315.11 |
| 4,645,167 A * | 2/1987 | Hardwick | B63B 29/04 | 248/283.1 |
| 4,681,219 A * | 7/1987 | Kitchens | A01K 97/06 | 206/315.11 |
| 4,682,813 A * | 7/1987 | Fohr | A01K 97/06 | 108/151 |
| 4,745,704 A * | 5/1988 | Schaefer | A45C 5/00 | 297/188.12 |
| 4,790,432 A * | 12/1988 | Rees | A01K 97/06 | 206/315.11 |
| 4,826,007 A * | 5/1989 | Skeie | A63H 33/30 | 206/373 |
| 4,887,379 A * | 12/1989 | Harrison | A01K 97/06 | 43/54.1 |
| 4,999,943 A * | 3/1991 | Crabtree | A01K 97/06 | 43/54.1 |
| 5,000,412 A * | 3/1991 | Sheehan | A01K 97/06 | 248/286.1 |
| 5,163,694 A * | 11/1992 | Reichek | A01K 97/06 | 280/47.26 |
| 5,186,329 A * | 2/1993 | Fogelberg | B25H 3/00 | 206/372 |
| 5,244,700 A * | 9/1993 | Banschick | A01G 5/04 | 211/13.1 |
| 5,261,561 A * | 11/1993 | Hodges, Jr. | B65D 25/00 | 206/315.11 |
| 5,271,520 A * | 12/1993 | McAfee | A01K 97/06 | 206/315.11 |
| 5,303,500 A * | 4/1994 | Luukonen | A01K 97/01 | 206/315.11 |
| 5,350,065 A * | 9/1994 | Darrey | B25H 3/00 | 206/373 |
| 5,379,885 A * | 1/1995 | Chen | B25H 3/04 | 206/216 |
| 5,390,944 A * | 2/1995 | Sherwin | B62B 3/00 | 211/70.6 |
| 5,481,822 A * | 1/1996 | Engels | A01K 97/06 | 297/188.12 |
| 5,560,145 A * | 10/1996 | Anderson | A01K 97/06 | 403/373 |
| 5,577,458 A * | 11/1996 | Kohl | A47B 83/00 | 114/363 |
| 5,622,261 A * | 4/1997 | Mobley | G09F 15/0025 | 206/457 |
| 5,724,764 A * | 3/1998 | Alsup | A01K 97/06 | 220/525 |
| 5,799,787 A * | 9/1998 | Talbot | B25H 3/025 | 206/315.11 |
| 5,836,446 A * | 11/1998 | Varnom | B25H 3/026 | 206/373 |
| 5,967,315 A * | 10/1999 | Langtry, II | A01K 97/06 | 206/315.11 |
| 5,971,333 A * | 10/1999 | Fiedor | B25H 3/06 | 206/373 |
| 5,987,804 A * | 11/1999 | Shearer | A01K 97/10 | 43/21.2 |
| 6,042,180 A * | 3/2000 | Lombardi | A01K 97/22 | 248/538 |
| 6,073,387 A * | 6/2000 | Torkilsen | A01K 97/01 | 206/315.11 |
| 6,105,768 A * | 8/2000 | Brown | B25H 3/04 | 206/373 |
| 6,254,055 B1 * | 7/2001 | Lamberson, Jr. | A01K 97/10 | 206/315.11 |
| 6,349,827 B1 * | 2/2002 | Feder | B25H 3/003 | 206/373 |
| 6,360,891 B1 * | 3/2002 | Rideout | B25H 3/00 | 206/372 |
| 6,364,150 B1 * | 4/2002 | Persinger | A01K 97/06 | 206/373 |
| 6,681,517 B1 * | 1/2004 | Solomon | A01K 97/10 | 43/21.2 |
| 6,729,066 B1 * | 5/2004 | Howley | A01K 97/05 | 43/54.1 |
| 6,785,999 B1 * | 9/2004 | Spada | A01K 97/22 | 43/54.1 |
| 6,883,268 B2 * | 4/2005 | Fraser | A01K 97/22 | 206/315.11 |
| 6,928,950 B2 * | 8/2005 | Trammell | E02B 3/20 | 114/382 |
| 6,938,761 B2 * | 9/2005 | Nish | A45C 3/00 | 206/315.11 |
| 6,953,128 B2 * | 10/2005 | Pfister | A01K 97/04 | 220/507 |
| 7,036,668 B2 * | 5/2006 | Udy | B25H 3/04 | 211/60.1 |
| 7,047,688 B2 * | 5/2006 | Sandman, Jr. | A01K 97/10 | 248/512 |
| 7,150,123 B1 * | 12/2006 | Fox | A01K 97/01 | 43/54.1 |
| 7,219,465 B2 * | 5/2007 | Beech | A01K 97/05 | 43/55 |
| 7,392,612 B2 * | 7/2008 | Winkler | A01K 97/06 | 297/188.21 |
| 7,533,931 B1 * | 5/2009 | Bryant, Sr. | A47C 7/62 | 297/188.08 |
| 7,594,353 B2 * | 9/2009 | Lucky | A01K 97/08 | 211/70.8 |
| 7,650,713 B1 * | 1/2010 | Peede | A01K 97/10 | 43/21.2 |
| 7,676,983 B2 * | 3/2010 | Jenkins | A01K 97/06 | 248/512 |
| D633,981 S * | 3/2011 | Sedor | D22/136 | |
| 7,901,000 B1 * | 3/2011 | Sorensen | A47C 7/62 | 297/188.08 |
| 8,251,269 B2 * | 8/2012 | Winneur | A45C 9/00 | 224/629 |
| 8,615,921 B1 * | 12/2013 | Weems | A01K 97/05 | 220/592.2 |
| 8,915,010 B1 * | 12/2014 | Gardner | A01K 97/02 | 220/560 |
| 9,155,292 B1 * | 10/2015 | Tweedie | A01K 97/10 | |
| 9,314,008 B2 * | 4/2016 | DeSpiegelaere | A01K 97/01 | |
| 9,357,756 B2 * | 6/2016 | Davis | A01K 97/04 | |
| D766,603 S * | 9/2016 | Alder | D6/336 | |
| 10,098,335 B2 * | 10/2018 | Cooper | A01K 97/04 | |
| D843,546 S * | 3/2019 | Fagin | D22/147 | |
| 10,405,531 B1 * | 9/2019 | Denmark | A01K 97/06 | |
| 2003/0196924 A1 * | 10/2003 | Zilberman | A47G 19/2227 | 206/459.5 |
| 2003/0230684 A1 * | 12/2003 | Clary | A01K 97/06 | 248/219.2 |
| 2005/0039377 A1 * | 2/2005 | Clary | A01K 97/06 | 43/54.1 |
| 2005/0189250 A1 * | 9/2005 | Hsu | B25H 3/003 | 206/373 |

(56) References Cited

U.S. PATENT DOCUMENTS

| | | | | |
|---|---|---|---|---|
| 2005/0252071 | A1* | 11/2005 | Urban | A01K 97/06 43/21.2 |
| 2006/0016119 | A1* | 1/2006 | Ashburn, Jr. | A01K 97/05 43/56 |
| 2006/0048441 | A1* | 3/2006 | Sharff | A01K 97/06 43/54.1 |
| 2007/0256348 | A1* | 11/2007 | Fox | A01K 97/01 43/54.1 |
| 2007/0283614 | A1* | 12/2007 | Kessler | A01K 97/06 43/54.1 |
| 2009/0008280 | A1* | 1/2009 | Nilferli | B25H 3/04 206/373 |
| 2009/0119975 | A1* | 5/2009 | Yearack | A01K 97/06 43/54.1 |
| 2009/0139132 | A1* | 6/2009 | Knight | A01K 97/04 43/54.1 |
| 2010/0313464 | A1* | 12/2010 | Bain | A01K 97/06 43/54.1 |
| 2011/0233357 | A1* | 9/2011 | Owen | A01K 97/10 248/224.8 |
| 2012/0193951 | A1* | 8/2012 | Solomon | A01K 97/10 297/188.01 |
| 2014/0203600 | A1* | 7/2014 | Rushing | A01K 97/22 297/188.21 |
| 2014/0331543 | A1* | 11/2014 | Hancock | A01K 97/01 43/17 |
| 2015/0159394 | A1* | 6/2015 | Oliveira | E04H 12/22 135/15.1 |
| 2015/0208634 | A1* | 7/2015 | Box | A01K 97/10 108/25 |
| 2015/0216157 | A1* | 8/2015 | Flanagan | A01K 97/10 43/27.4 |
| 2015/0313201 | A1* | 11/2015 | Carnevali | H01F 7/0252 43/54.1 |
| 2018/0110335 | A1* | 4/2018 | O'Hagan | A01K 97/22 |
| 2019/0125085 | A1* | 5/2019 | O'Neal | A47C 7/68 |
| 2020/0015468 | A1* | 1/2020 | Jelinek | F16B 2/065 |

* cited by examiner

TACKLE BUDDY

The current application claims a priority to the U.S. Provisional Patent application Ser. No. 62/365,078 filed on Jul. 21, 2016.

FIELD OF THE INVENTION

The present invention relates generally to fishing. More specifically, the present invention is a container for storing and organizing fishing accessories, such as tackles and hooks, while simultaneously providing easy access to said accessories.

BACKGROUND OF THE INVENTION

When fishing, it is common for a variety of equipment to be utilized throughout the trip. Especially when fishing on a boat, it is cumbersome for individuals to have to get up and retrieve equipment. It would be safer for the individual to remain in their seat, rather than getting up and walking back and forth on the boat. Additionally, it would save the fisher more time if their equipment was easily accessible, within arm's reach.

Therefore, it is an objective of the present invention to provide a fishing accessory organizer that is installed underneath of a boat seat and allows a user to conveniently locate and retrieve equipment needed throughout the duration of a fishing outing. The present invention is ergonomically shaped so as not to interfere with the user's legs. The present invention provides a container body that has a plurality of organization cavities, each of various size and shape, for holding different fishing equipment. The container body is rotatable about the pedestal pole of the boat seat, and can be height adjusted using a locking plate.

DETAIL DESCRIPTIONS OF THE INVENTION

All illustrations of the drawings are for the purpose of describing selected versions of the present invention and are not intended to limit the scope of the present invention.

The present invention is a fishing accessory organizer for storing fishing accessories, while allowing the fishing accessories to be readily accessed while fishing. The present invention is installed underneath of a boat seat and allows a user to conveniently locate and retrieve equipment needed throughout the duration of a fishing outing. Rather than having to get up and down, or walk back and forth across the boat, the present invention allows needed equipment to be easily stored within arm's reach.

Figure 4:
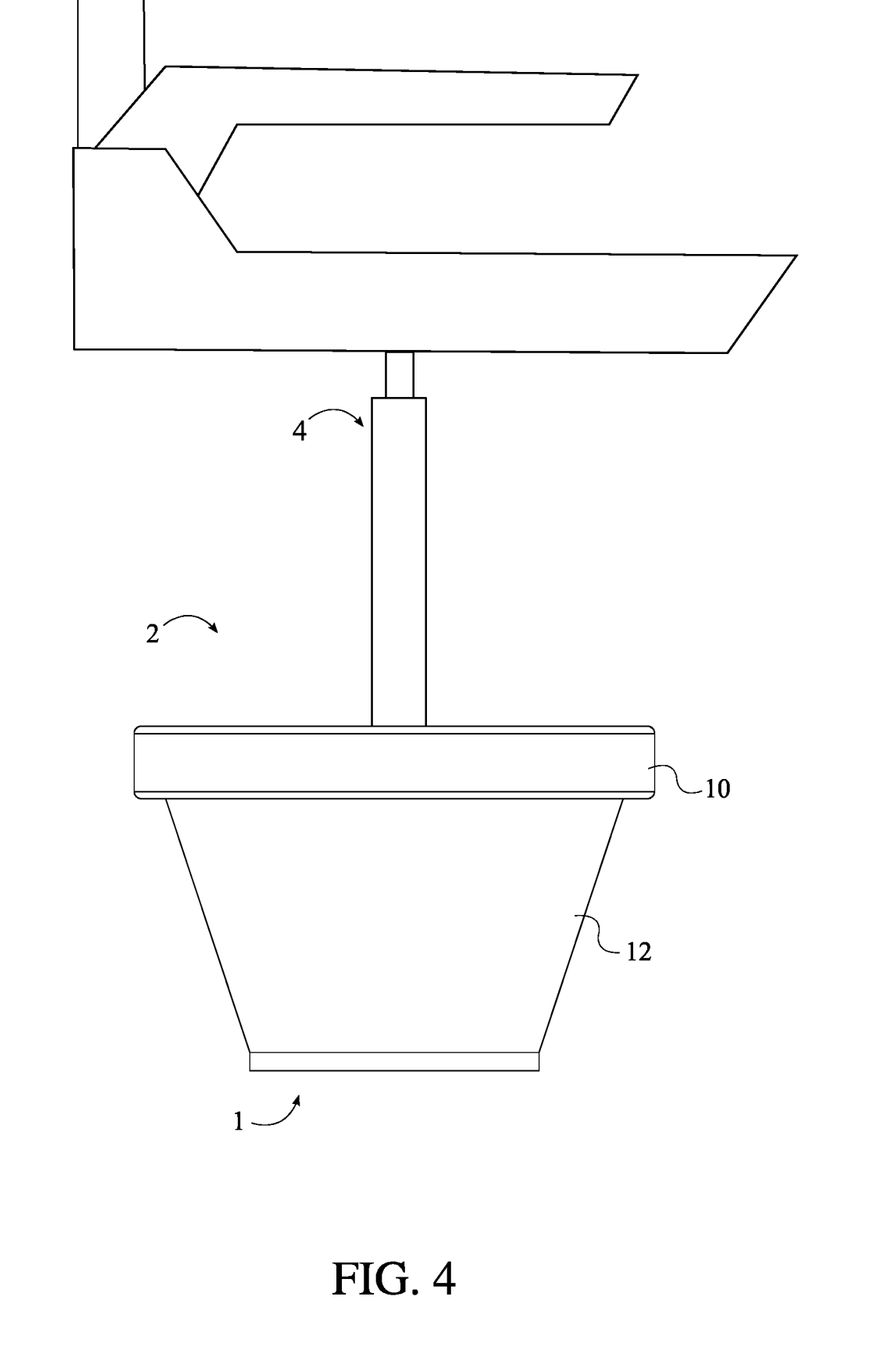
FIG. 4 is a diagram showing the present invention being installed around the pedestal pole of a boat seat.
Figure 5:
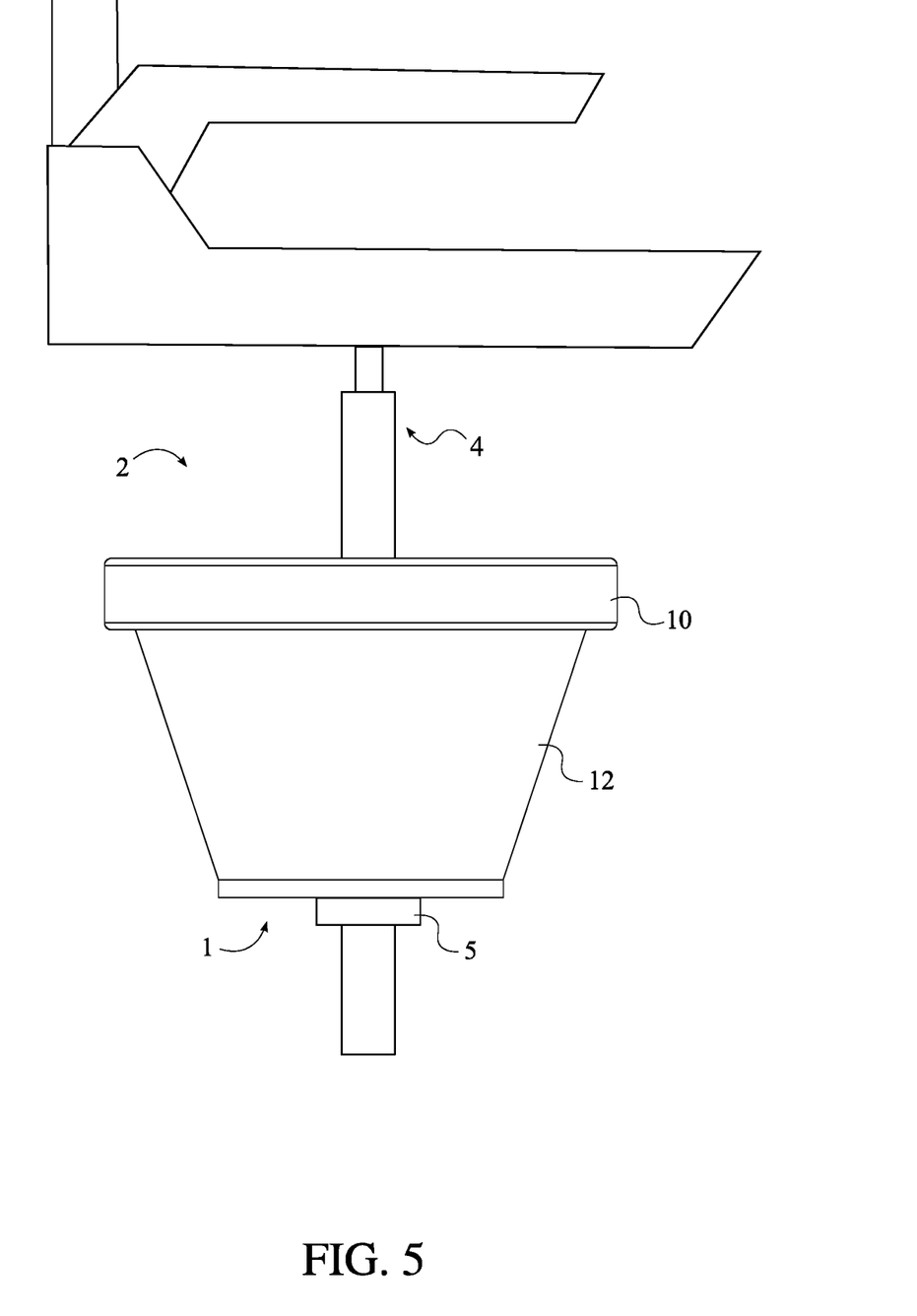
FIG. 5 is a diagram showing the container body being elevated by the locking plate.

The present invention comprises a container body 1 and a locking plate 5. The container body 1 is secured around a pedestal pole 4 of a boat seat as shown in FIG. 4, and provides a means for storing the fishing equipment. Meanwhile, the locking plate 5 allows the user to adjust the position of the container body 1 along the pedestal pole 4 (i.e. change the height at which the container body 1 is mounted), as depicted in FIG. 5.

Figure 1:
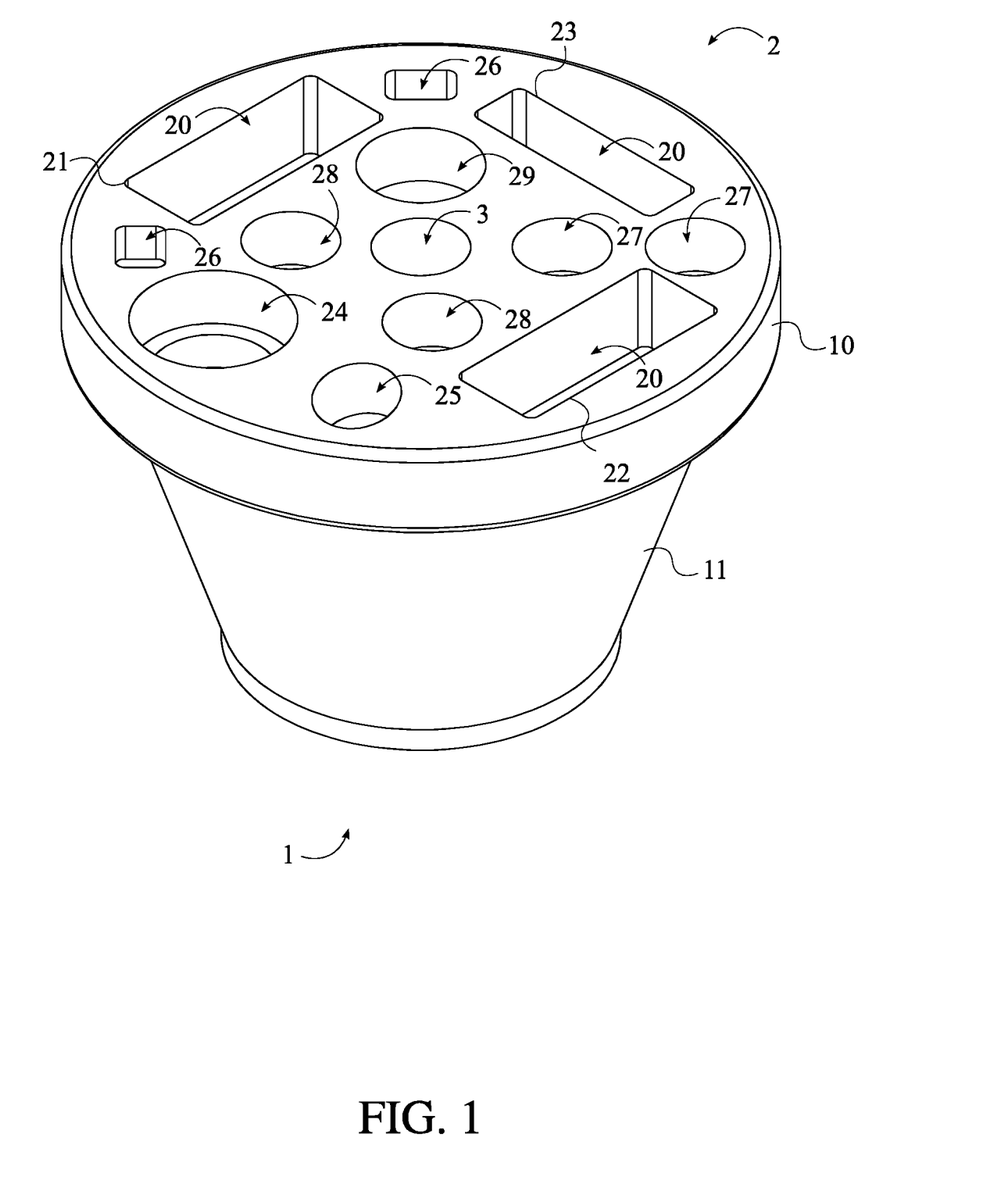
FIG. 1 is a perspective view of the present invention.

In reference to FIG. 1, the container body 1 comprises a top frame 10 and a bottom frame 12, wherein the top frame 10 is perimetrically connected to the bottom frame 12. In one embodiment, a plurality of braces is utilized to mount the top frame 10 to the bottom frame 12. The bottom frame 12 tapers away from the top frame 10, creating a conic profile for the container body 1. The conic shape of the container body 1 eliminates contact between the present invention and a user's feet and legs, when the present invention is installed below a boat seat. Furthermore, the conic shape results in the top frame 10 providing an enlarged surface that allows more equipment to be stored and accessed.

Figure 2:
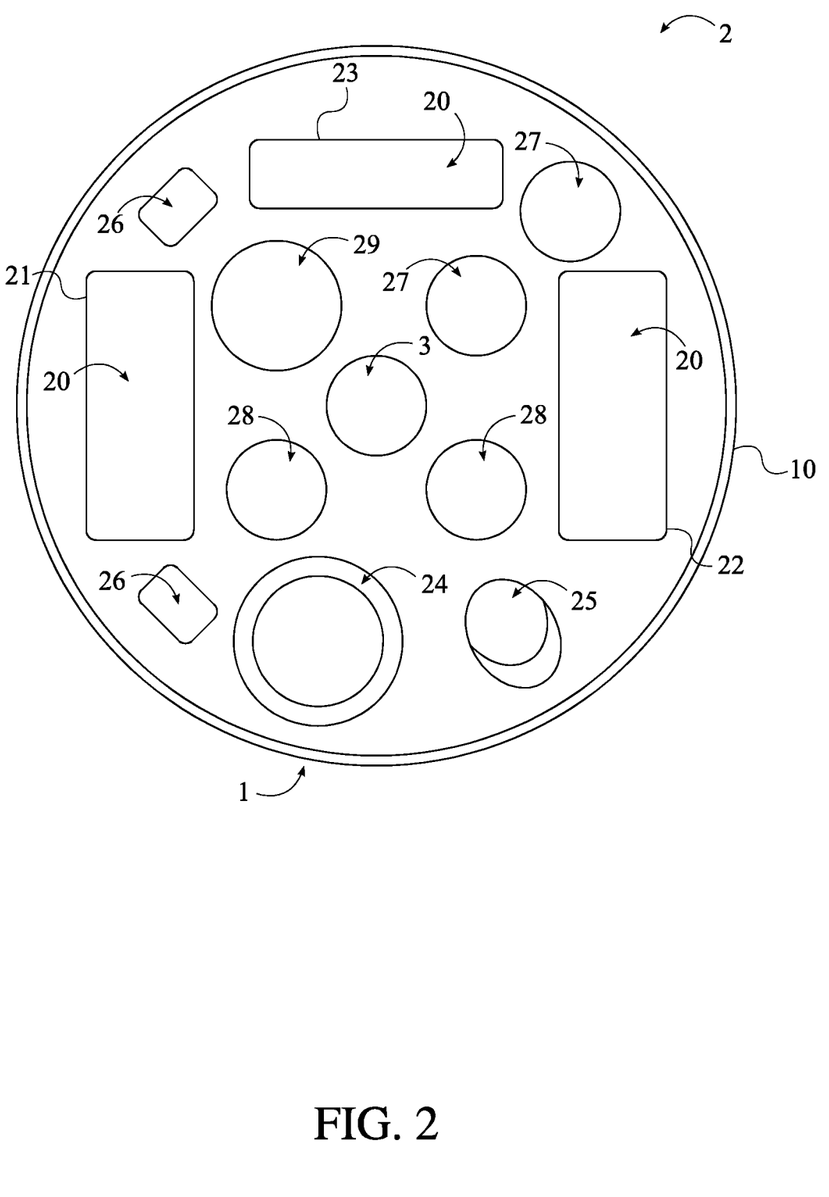
FIG. 2 is a top plan view of the present invention.
Figure 3:
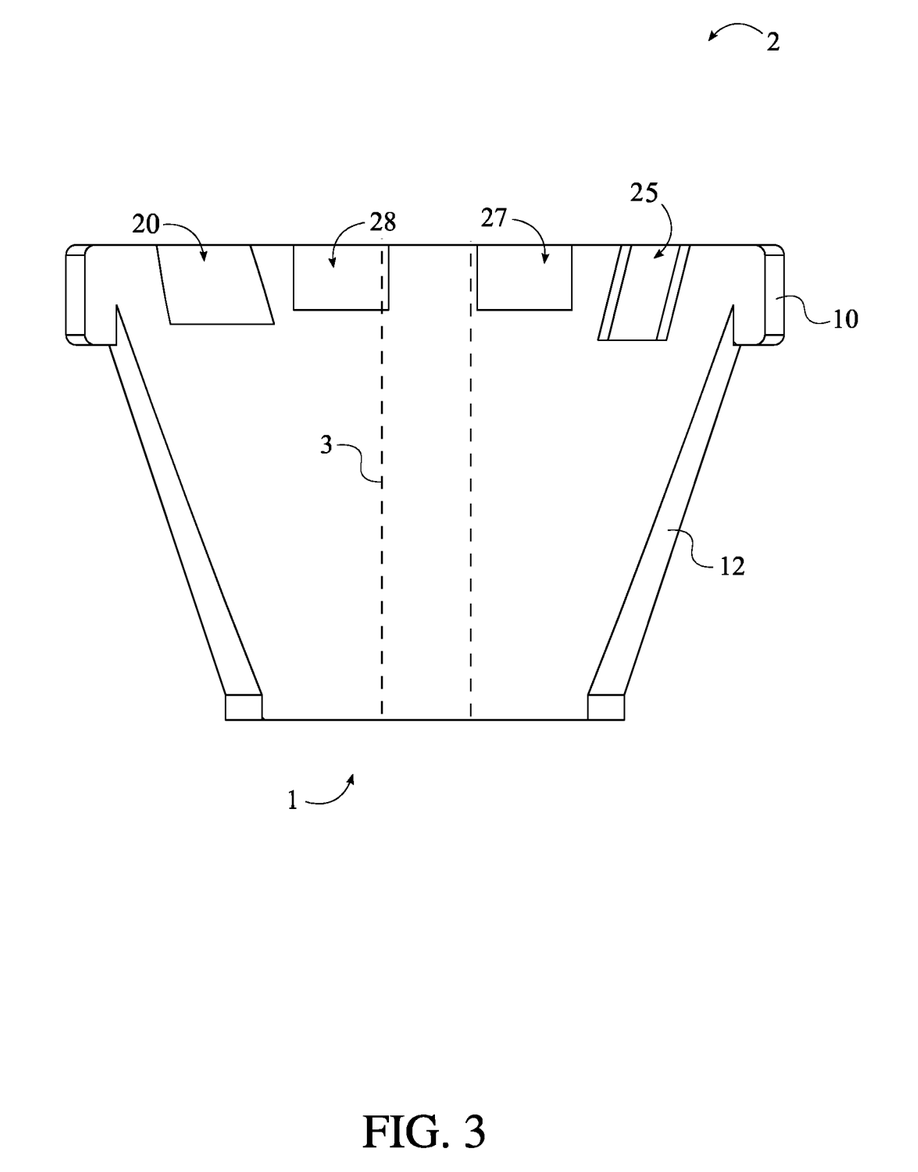
FIG. 3 is a sectional view of the present invention.

In reference to FIG. 2 and FIG. 3, a seat pole hole 3 traverses through the container body 1 from the top frame 10 to the bottom frame 12. The seat pole hole 3 provides a means for securing the container body 1 to the pedestal pole 4, wherein the container body 1 is fitted around the pedestal pole 4, such that the pedestal pole 4 traverses through the seat pole hole 3. In the preferred embodiment of the present invention, the radius of the seat pole hole 3 is larger than the radius of the pedestal pole 4, such that the container body 1 is able to rotate about the pedestal pole 4. This allows orientation of the container body 1 to be easily manipulated in order to access all equipment stored using the present invention.

Furthermore, in the preferred embodiment of the present invention, the seat pole hole 3 is centrally positioned about the container body 1, as depicted in FIG. 3. This allows for a more even weight distribution across the container body 1. In turn, the more even weight distribution allows the container body 1 to be more easily rotated about the pedestal pole 4.

In reference to FIG. 5, the locking plate 5 is positioned adjacent to the bottom frame 12, opposite the top frame 10, and is aligned with the seat pole hole 3. The locking plate 5 provides a means for clamping, or otherwise attaching, to the pedestal pole 4, and a means for supporting the container body 1. The locking plate 5 engages with the pedestal pole 4 and can be fixed in place along the pedestal pole 4 at the desired height. A clamping mechanism, or similar mechanism, temporarily affixes the locking plate 5 at the desired height along the pedestal pole 4.

The locking plate 5 sits below the container body 1, wherein the container body 1 rests on top of the locking plate 5. Once the locking plate 5 is secured to the pedestal pole 4, the container body 1 is fitted around the pedestal pole 4 and onto the locking plate 5. The locking plate 5 supports the container body 1, wherein the container body 1 is raised to the desired height, allowing the user to easily access equipment stored in the container body 1. In some embodiments, the locking plate 5 is connected to the container body 1 forming a single structure that is mounted onto the pedestal pole 4. In other embodiments, the locking plate 5 and the container body 1 are two separate bodies, wherein the container body 1 can freely rotate about the pedestal pole 4.

In reference to FIG. 1 and FIG. 2, a plurality of organization cavities 2 is formed into the container body 1 through the top frame 10, wherein the plurality of organization cavities 2 provides a means for storing the desired fishing equipment. Each of the plurality of organization cavities 2 is of various shape and size to allow for a variety of equipment to be stored. In one embodiment of the present invention, the plurality of organization cavities 2 comprises a plurality of bait box cavities 20, a drink holder cavity 24, a rod holder cavity 25, a pair of plyer cavities 26, a pair of bait jar cavities 27, a pair of paint jar cavities 28, and a spray can cavity 29.

The plurality of bait box cavities 20, the drink holder cavity 24, the rod holder cavity 25, the pair of plyer cavities 26, the pair of bait jar cavities 27, the pair of paint jar cavities 28, and the spray can cavity 29 are radially distributed about the seat pole hole 3, such that fishing equipment can be stored 360 degrees around the pedestal pole 4. The drink holder cavity 24, the pair of plyer cavities 26, the pair of bait jar cavities 27, the pair of paint jar cavities 28, and the spray can cavity 29 are oriented normal to the top frame 10 such that items stored within are held vertically upright. Meanwhile, the plurality of bait box cavities 20 and the rod holder cavity 25 are angled in relation to the top frame 10, as depicted in FIG. 3.

The angled nature of the plurality of bait box cavities 20 and the rod holder cavity 25 allow the user to easily remove tackleboxes and a fishing rod from the container body 1. Each of the plurality of bait box cavities 20 is sloped inwards, towards the center of the container body 1. In this way, when a tacklebox is placed in one of the plurality of bait box cavities 20, the tacklebox is angled outwards, away from the boat seat. This angled position of the tacklebox allows the user to readily grab and remove the tacklebox.

Similar to the plurality of bait box cavities 20, the rod holder cavity 25 is sloped inwards, towards the center of the container body 1. In this way, when the fishing rod handle is positioned into the rod holder cavity 25, the fishing rod extends from the container body 1 and is angled away from the boat seat. The angled position of the fishing rod allows the user to readily pickup and maneuver the fishing rod without interference from the boat seat.

In one embodiment of the present invention, the plurality of bait box cavities 20 comprises a first bait box cavity 21, a second bait box cavity 22, and a third bait box cavity 23. The first bait box cavity 21 and the second bait box cavity 22 are positioned opposite each other about the seat pole hole 3, while the third bait box cavity 23 is positioned in between the first bait box cavity 21 and the second bait box cavity 22, offset from the seat pole hole 3. The third bait box cavity 23 is positioned perpendicular to the first bait box cavity 21 and the second bait box cavity 22. In this way, the plurality of bait box cavities 20 is rather evenly distributed about the container body 1, allowing bait boxes to be adequately spaced and accessible.

Each of the plurality of bait box cavities 20 is intended to retain a tacklebox that is used to retain needed fishing equipment, such as hooks, lures, etc. In one embodiment, the two of the bait box cavities are 5⅝ inches long and 2¼ inches wide, while another bait box cavity is 5¼ inches long and 1⅝ inches wide.

The drink holder is intended to retain a cup, bottle, etc. In some embodiments, the drink holder cavity 24 may be stepped, allowing the drink holder cavity 24 to securely retain beverage containers having various diameters. In one embodiment, the drink holder cavity 24 is 3¾ inches in diameter and 2¾ inches deep.

The rod holder cavity 25 is intended to retain the handle of a fishing rod. The rod holder has an ovular cross-sectional profile, and is angled such that the fishing rod is angled away from the boat seat. In one embodiment, the ovular cross section of the rod holder cavity 25 is 2 inches long and 1⅞ inches wide.

Each of the pair of plyer cavities 26 is intended to retain a pair of plyers or another similar sized tool. In one embodiment, each of the pair of plyer cavities 26 is 1¼ inches long and ¾ inches wide.

Each of the pair of bait jar cavities 27 is intended to retain a jar of bait used for the current type of fishing. In one embodiment, each of the pair of bait jar cavities 27 is 2 inches in diameter and 1¾ inches deep.

Each of the pair of paint jar cavities 28 is intended to retain a jar of fishing lure paint that can be used to paint the lures being used. In one embodiment, the each of the pair of paint jar cavities 28 is 2 inches in diameter and 1¾ inches deep.

The spray can cavity 29 is intended to retain an aerosol can, such as bait spray. In one embodiment, the spray can cavity 29 is 2¾ inches in diameter and 2¾ inches deep.

In some embodiments, the container body 1 may include at least one of a light display, a radio, and a phone. The light display may include a single light or multiple lights. The light display may provide an aesthetic, mood lighting, or the light display may be used to provide a functional light source that can be used to help identify fishing accessories stored in the container body 1.

The radio includes a receiver and a speaker. The receiver picks up radio signals and directs the radio signals through a circuit to the speaker. An antenna may also be provided to increase the reception of radio signals. The antenna could be internally or externally mounted to the container body 1. The speaker can be integrated into the container body 1, such that sound is emitted from the top, sides, or bottom of the container body 1. The radio may also include a transmitter for communicating with another electronic device, such as a smartphone.

The phone includes a cellular antenna, a processor, a speaker, and a microphone. The cellular antenna sends and receives signals across one or more cellular networks. The processor is connected in between the cellular antenna, the speaker, and the microphone wherein the processor facilitates communication with another electronic device. The processor receives inputs from the cellular antenna and sends outputs to the speaker, and receives inputs from the microphone and sends outputs to the cellular antenna.

A power source is also provided in order to provide the light display, the radio, or the phone with electrical current. The power source can be a battery that is positioned within the container body 1. The battery may be rechargeable, wherein a charge port is integrated with the container body 1, or replaceable, wherein an access panel is integrated with the container body 1. Alternatively, the power source may be a power chord for plugging into the electrical system of the boat.

Figure 6:
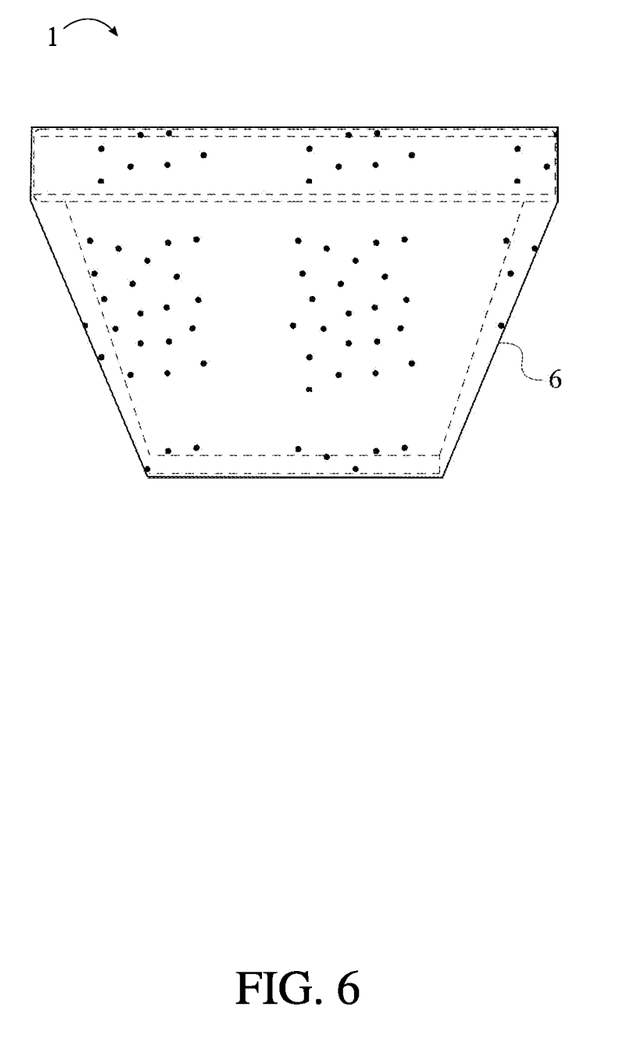
FIG. 6 is a front view, wherein the container body is encompassed by the cover.

In reference to FIG. 6, in some embodiments, the present invention may further comprise a cover 6. The cover 6 encompasses the container body 1 and provides the container body 1 with an aesthetically pleasing outer surface. The cover 6 may also be utilized to protect the container body 1 from wear and tear. The cover 6 may be a flexible piece of material that is fitted and compressed around the container body 1, or the cover 6 may be attached to the container body 1 using another means of connection, such as snaps, buttons, hooks, etc.

Although the invention has been explained in relation to its preferred embodiment, it is to be understood that many other possible modifications and variations can be made without departing from the spirit and scope of the invention as hereinafter claimed.

What is claimed is:

1. A fishing accessory organizer comprising:
    a container body;
    the container body comprising a top frame and a bottom frame;
    the top frame being perimetrically connected to the bottom frame;
    a plurality of organization cavities being formed into the container body through the top frame;
    a seat pole hole traversing through the container body from the top frame to the bottom frame;
    the seat pole hole traversing completely through the container body by traversing completely through the top frame and the bottom frame;
    the bottom frame tapering away from the top frame;
    the plurality of organization cavities comprising a plurality of bait box cavities, a drink holder cavity and a rod holder cavity;
    the plurality of bait box cavities, the drink holder cavity and the rod holder cavity being radially distributed about the seat pole hole;
    the drink holder cavity being oriented normal to the top frame; and
    the plurality of bait box cavities and the rod holder cavity being angled in relation to the top frame via the plurality of bait box cavities and the rod holder cavity each being sloped inwards and towards a center of the container body.

2. The fishing accessory organizer as claimed in claim 1 comprising:
    a locking plate;
    the locking plate being positioned adjacent to the bottom frame;
    the locking plate being aligned with the seat pole hole;
    the locking plate being externally positioned to the bottom frame;
    the bottom frame being located in between the locking plate and the top frame:
    a pedestal pole;
    the pedestal pole traversing through the seat pole hole;
    the pedestal pole traversing through the locking plate; and
    the locking plate being configured to engage with the pedestal pole and being configured to be fixed in place along the pedestal pole so as to support the container body.

3. The fishing accessory organizer as claimed in claim 2, wherein the container body is rotatable about the pedestal pole.

4. The fishing accessory organizer as claimed in claim 1, wherein the drink holder cavity is stepped.

5. The fishing accessory organizer as claimed in claim 1 comprising:
    the seat pole hole being centrally positioned within the container body.

6. The fishing accessory organizer as claimed in claim 1 comprising:
    a cover; and
    the cover encompassing the container body.

7. The fishing accessory organizer as claimed in claim 1 comprising:
    the plurality of organization cavities comprising a pair of plyer cavities; and
    the pair of plyer cavities being oriented normal to the top frame.

8. The fishing accessory organizer as claimed in claim 1 comprising:
    the plurality of organization cavities comprising a pair of bait jar cavities; and
    the pair of bait jar cavities being oriented normal to the top frame.

9. The fishing accessory organizer as claimed in claim 1 comprising:
    the plurality of organization cavities comprising a pair of paint jar cavities; and
    the pair of paint jar cavities being oriented normal to the top frame.

10. The fishing accessory organizer as claimed in claim 1 comprising:
    the plurality of organization cavities comprising a spray can cavity; and
    the spray can cavity being oriented normal to the top frame.

11. The fishing accessory organizer as claimed in claim 1 comprising:
    the plurality of bait box cavities comprising a first bait box cavity, a second bait box cavity and a third bait box cavity;
    the first bait box cavity and the second bait box cavity being positioned opposite each other about the seat pole hole; and
    the third bait box cavity being positioned perpendicular to the first bait box cavity and the second bait box cavity.

* * * * *